C. A. HUSSEY.
Galvanic Battery.

No. 201,924. Patented April 2, 1878.

WITNESSES:
Chas. Nida
C. Sedgwick

INVENTOR:
C. A. Hussey
BY Munn & Co
ATTORNEYS.

UNITED STATES PATENT OFFICE.

CHARLES A. HUSSEY, OF NEW YORK, N. Y.

IMPROVEMENT IN GALVANIC BATTERIES.

Specification forming part of Letters Patent No. 201,924, dated April 2, 1878; application filed March 6, 1878.

*To all whom it may concern:*

Figure 1:
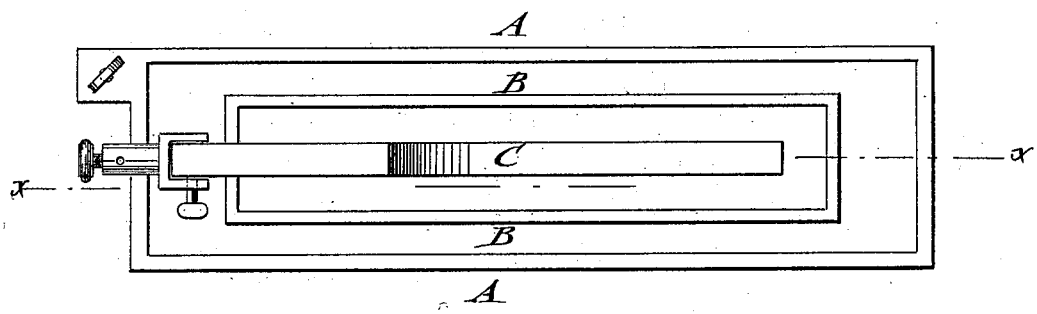
Figure 2:
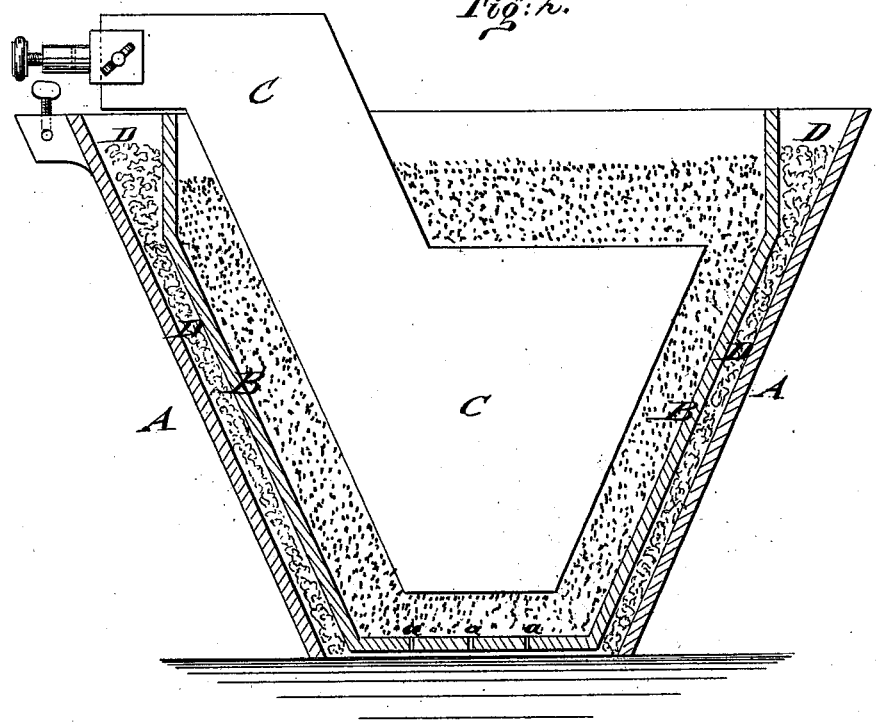

Be it known that I, CHARLES A. HUSSEY, of the city, county, and State of New York, have invented a new and Improved Electric Battery, of which the following is a specification:

In the accompanying drawing, Figure 1 represents a top view, and Fig. 2 a vertical longitudinal section on line $x\,x$, Fig. 1, of my improved electric battery.

Similar letters of reference indicate corresponding parts.

This invention has for its object to furnish, for domestic or other use, for running sewing-machines and other light machinery, also for pleasure-boats, &c., an improved electric battery, that, when in use, has the functions of a dry battery, and is not liable to spill the exciting and oxidizing liquids, and which has a further advantage of not being deteriorated or run down by the saturation of the exciting liquid by the zinc salts or the saturation of the oxidizing liquid by the hydrogen. An economical battery, with constant current, that requires but little attention, is thereby furnished.

The invention consists of a battery composed of an exterior zinc cup with open bottom, and of an interior porous cup having perforated bottom, the space between the cups being filled with an interposed absorbent packing, and the interior of the porous cup, around the carbon-pole, with absorbent material, so that the exciting and oxidizing liquids are readily drained off at the bottom.

Referring to the drawing, A represents the outer cup, made of zinc or other metal of suitable thickness, and preferably with inclined sides. The zinc cup A is open at the bottom, and connected by a set-screw in the customary manner to the adjoining cup of the battery.

At the interior of the zinc cup A is arranged, at suitable distance therefrom, a porous cup, B, of suitable material, that corresponds in general shape to the outer zinc cup, and is provided with perforations $a$ in the bottom, for the purpose of draining off the superfluous moisture.

At the interior of the porous cup is arranged the carbon-pole C, which is surrounded nearly up to the top of the porous cup B with a suitable filling, consisting, preferably, of small pieces of graphite or other granulated carbon particles, which, when once moistened by the oxidizing liquid, retain the moisture for a certain length of time.

The upper end of the carbon-pole C is connected in the customary manner, by clamp and set-screw, with the zinc-pole of the adjoining cell.

Intermediately between the zinc cup A and porous cup B is interposed a fibrous absorbent packing, D, that is tightly pressed into the space between the cups. For this packing common cotton wadding or other suitable material may be employed. The packing is saturated with the exciting liquid, and any excess of the liquid drained off through the open bottom of the same to a suitable receptacle or by a drain-pipe to the earth. In similar manner the surplus moisture of the filling in the porous cup is drained off through the bottom perforations of the cup. In this manner an electric pile is obtained that possesses all the virtues of a dry battery, and requires only re-moistening from time to time—say, once a day, or even less frequently—and obviates some of the annoyances and objections to the liquid batteries at present in use.

The main point of advantage of this draining battery, however, consists in the fact that the saturation of the exciting solution in liquid batteries by the zinc salts, and the consequent running down of the battery, is obviated, as these salts are dissolved and drained off by the exciting liquid when it passes through the absorbent packing.

In analogous manner the hydrogen generated is taken up by the oxidizing agent in the porous cup and drained off therewith through the perforated bottom of the cup. As long as, therefore, the packing and filling in the cells retain moisture a battery of constant current is obtained, that is not liable to spilling, and therefore specially adapted, by its economy and convenience, for general purposes.

Having thus described my invention, I claim as new and desire to secure by Letters Patent—

1. An electric draining battery having an absorbent packing interposed between the zinc and porous cups, substantially as and for the purpose set forth.

2. An electric draining battery having an absorbent packing interposed between the zinc and porous cups and an absorbent filling around the carbon-pole of the porous cup, substantially as and for the purpose described.

3. An electric battery composed of an outer zinc cup with open bottom, an interior porous cup with perforated bottom, and of an interposed absorbent packing, substantially as described.

4. An electric battery made of an outer zinc cup and of an inner porous cup, with an absorbent packing interposed between the zinc and porous cups, and with a filling of absorbent material in the inner cup, the cups being arranged to drain off the exciting and oxidizing liquids at the bottom, substantially as specified.

CHARLES A. HUSSEY.

Witnesses:
PAUL GOEPEL,
C. SEDGWICK.